Nov. 26, 1968   J. RIGAL   3,413,193
MODERATOR TANK FOR PRESSURE TUBE REACTOR
Filed March 27, 1967   4 Sheets-Sheet 1

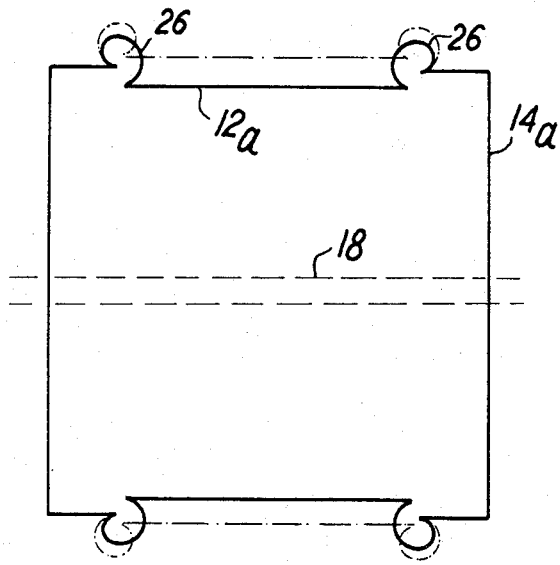
FIG.6
FIG.7
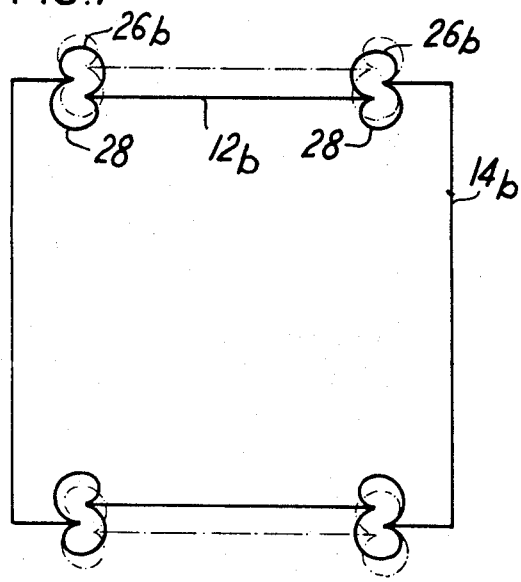

Nov. 26, 1968  J. RIGAL  3,413,193

MODERATOR TANK FOR PRESSURE TUBE REACTOR

Filed March 27, 1967  4 Sheets-Sheet 4

United States Patent Office 3,413,193
Patented Nov. 26, 1968

3,413,193
MODERATOR TANK FOR PRESSURE TUBE REACTOR
Jean Rigal, Firminy, France, assignor to Commissariat à l'Energie Atomique, Paris, France
Filed Mar. 27, 1967, Ser. No. 626,334
Claims priority, application France, Apr. 6, 1966, 56,759
5 Claims. (Cl. 176—44)

ABSTRACT OF THE DISCLOSURE

The moderator calandria tank of a pressure tube reactor comprises a cylindrical casing having horizontal generator-lines and closed by two end-shields traversed by the pressure tubes. The tank casing comprises a flat rigid top wall and a side wall which is more readily deformable and the director-curve of which is substantially the catenary curve corresponding to the pressure distribution of liquid moderator within the tank.

---

This invention relates to a tank for nuclear reactors of the horizontal pressure tube type in which said tank serves to contain the liquid moderator.

In reactors of this type, the fuel assemblies are placed inside the leak-tight pressure tubes which pass through the moderator tank or calandria. A coolant is circulated through the pressure tubes at a pressure which is usually much higher than that of the moderator contained in the tank. Reactivity is adjusted by control rods consisting of neutron-absorbing elements which are caused to penetrate within the tank to a greater or lesser extent. The insertion of control rods, which are actuated from the exterior of the tank, is usually carried out transversely to the pressure tubes.

In the majority of present-day pressure-tube reactor designs, the moderator tank consists of a cylindrical calandria having a circular transverse section and a horizontal axis and closed by two end-shields. The control rods, which are disposed on a uniform lattice, move in a direction at right angles to the pressure tubes in linear paths which are left free by the pressure-tube lattice. It is evidently essential to ensure that both the pressure-tube lattice and the control-rod lattice are rigorously maintained in unvarying relation, irrespective of stresses to which the tank may be subjected. To this end, the pressure tubes can be maintained by rigid end-shields or provision may alternatively be made for flexible end-walls whilst the pressure tubes themselves are maintained by other means such as a separate structure.

This arrangement would appear to be both simple and advantageous by virtue of the fact that a circular cross-section with a horizontal axis is an equilibrium form under any conditions of internal pressure (this being strictly the case when the pressure is uniform but only approximately the case under conditions of hydrostatic pressure distribution, and then only if the liquid level reaches at least the top generator-line). In point of fact, such an arrangement is subject to three major drawbacks, viz:

The tubes which contain the control rod drive mechanisms are for the most part not coupled at right angles to the calandria tank, thus resulting in the need to provide coupling members having complex shapes if it is desired to form welded joints which can be tested and which conform to a high quality standard, The need to provide guide tubes for the control rods in turn makes it necessary *either* to locate these tubes at the level of the tank, with the result that (taking into account the curvature of said tank) control rod mechanisms cannot be of uniform length and are therefore not interchangeable, *or* to position said tubes at the ends of tubular extensions which serve to bring them all to the same horizontal level: extensions of this type are difficult to place with the requisite degree of precision;

Among the potential causes of accidents in reactors of this type, consideration has to be given primarily to the danger of catastrophic failure of pressure tubes. In such cases, the heat-transporting fluid which is at a high temperature and pressure is abruptly injected into the moderator and generates a sudden overpressure which is liable to deform the moderator vessel and even to result in its ultimate destruction.

The overpressure referred-to produces very substantial loading which in turn develops very high stresses, particularly in the end-shields; as a result of these stresses, calandria tanks of the type under consideration have to be provided with end-shields which have substantial rigidity, are of highly complex design, and therefore very difficult to construct.

Tests have shown that, all other factors being equal, the overpressure is in inverse ratio to the volume expansibility of the moderator vessel (increase in volume of the vessel under the action of a pressure rise equal to one unit). However, a cylindrical form with a circular section has particularly low volume expansibility. A circular section corresponds to a maximum surface area in respect of a given perimeter, with the result that expansibility under the action of a pressure rise is produced solely by expansion arising from tension of the calandria plates (to which should nevertheless be added the effect of bulging of the end-shields), taking into account the fact that any modification in the cross-sectional shape cannot produce any increase in volume.

This invention is directed to the design concept of a moderator tank for pressure tube reactors which meets practical requirements more effectively than has so far been permitted by comparable structures of the prior art, especially insofar as it minimizes or eliminates the disadvantages noted in the foregoing.

To this end, the invention proposes a tank comprising a cylindrical casing having horizontal generator-lines and closed by two end-shields traversed by the pressure tubes, said casing comprising a flat rigid top wall and a side wall which is more readily deformable and the director-curve of which is substantially the catenary curve corresponding to the pressure distribution of the moderator contained in the tank.

In other words, the director-line of the lateral portion of the tank has at each of its points a radius of curvature which is inversely proportional to the pressure of liquid which is exerted at this point under normal operating conditions.

A tank of this type is subject to deformation when the pressure of the moderator increases, whether its hydrostatic distribution is retained or not, and its cross-sectional shape approaches that of a circular arc with a correlative increase in the volume of the tank. The flat shape of the rigid top wall permits of ready assembly of the tubes for the insertion of control rods and also makes it possible to suspend the tank by means of tie-rods which are secured to said wall. It should be noted in this connection that the cylindrical form having a circular cross-section along a horizontal plane which passes through the center-line does not constitute an equilibrium form in respect of a hydrostatic pressure distribution and would therefore not permit effective utilization.

A better understanding of the invention will be gained by perusal of the following description of embodiments which are given solely by way of non-limitative example.

Reference will be made to the accompanying drawings, in which:

FIGS. 6 and 7 are diagrammatic views showing the outline of the tanks of FIGS. 4 and 5 under normal operating conditions and when they are subjected to an internal pressure rise;

Figure 1:
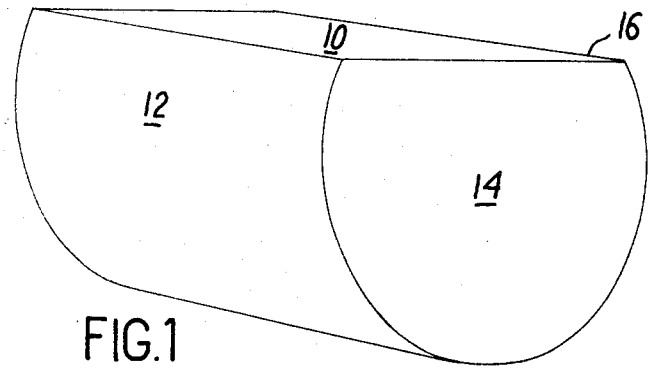
FIG. 1 is a perspective diagram of a moderator tank in accordance with the invention.

The moderator tank in accordance with the invention as shown very diagrammatically in FIG. 1 is made up of a top wall 10 constituted by a rigid plate 10, a side wall 12 which has greater deformability and two end-walls of which only the wall 14 is visible. The transverse cross-section of said tank when this latter is subjected to the hydrostatic distribution of pressures at which it is in a condition of equilibrium is shown in full lines in FIG. 2: the director-curve (namely the perimeter of the transverse cross-section) is accordingly constituted by the particular catenary curve of the hydrostatic forces exerted by the moderator liquid on the side wall which passes through two imposed points 16 and 16' (corresponding to the edges of the plate 10) and containing the intended volume of moderator liquid. There is added to the pressure exerted by the moderator an additional pressure $h_o$ which is maintained at the level of the points 16 and 16' and which may be exerted at this level and on the free surface of the moderator by a cushion of inert gas.

Figure 2:
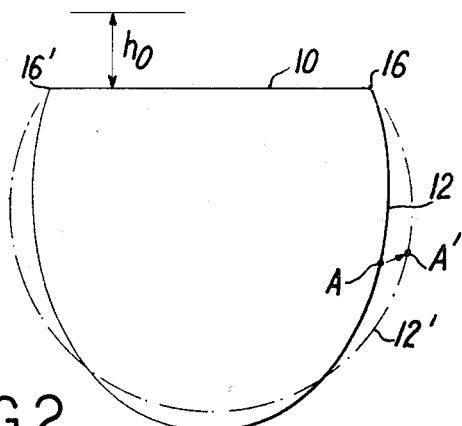
FIG. 2 shows the deformation of the transverse cross-section of the tank of FIG. 1 in the event of increase in the pressure which prevails within said tank.

If the pressure within the moderator tank increases (as a result of an increase in pressure $h_o$ at the level of the generator-lines 16 and 16') while the density of the moderator liquid contained in the tank and the length of the portion of catenary curve remain the same (this last-mentioned condition indicates that the calandria plates are not subjected to any elongation), the catenary curve 12 becomes deformed and approximates to a circular arc 12' (as indicated in chain-dotted lines in FIG. 2). At the ultimate value, that is to say when the pressure $h_o$ at the level of the generatrices 16 and 16' becomes very high with respect to the hydrostatic pressure variation inside the tank, the equilibrium cross-section in fact becomes a circular arc. Thus, inasmuch as the curve 12' delimits with the top face 10 a larger surface area than that which is located between the curve 12 and the top face 10, the moderator tank expands to a very substantial extent without thereby initiating any elongation of the plates which constitute the side wall of the tank. If the pressure rise is due, for example, to a violent injection of a volume of gas at high pressure into the tank, the overpressure to which the tank is subjected is attenuated to a marked degree.

Figure 3:
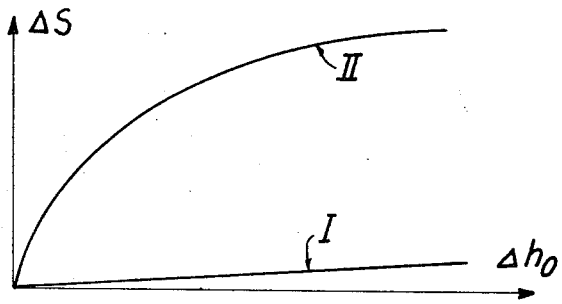
FIG. 3 is a diagram representing the increase in the transverse cross-section of a cylindrical tank in accordance with the invention and of that of a tank having a circular cross-section as a function of the increase in the pressure which prevails in said tanks.

The essential advantage of the invention will at once become apparent from FIG. 3 which shows the appearance of the variation of the transverse section $\Delta S$ as a function of the increase in pressure $\Delta h_o$ of a tank according to FIGS. 1 and 2 (curve I) in comparison with the increase in the transverse section of a circular cylindrical tank (curve II) having the same initial transverse section and subjected to equal stresses. In the case of the overpressures $\Delta h_o$ which are usually contemplated, the expansibility of the tank in accordance with the invention is approximately 9 times higher than that of the cylindrical tank having a circular section; the overpressure which is generated by the explosion or fast failure of a pressure tube, and which is between 7 and 10 bars in the case of a cylindrical tank of circular section, is reduced to 2.3–3.3 bars.

Figure 4:
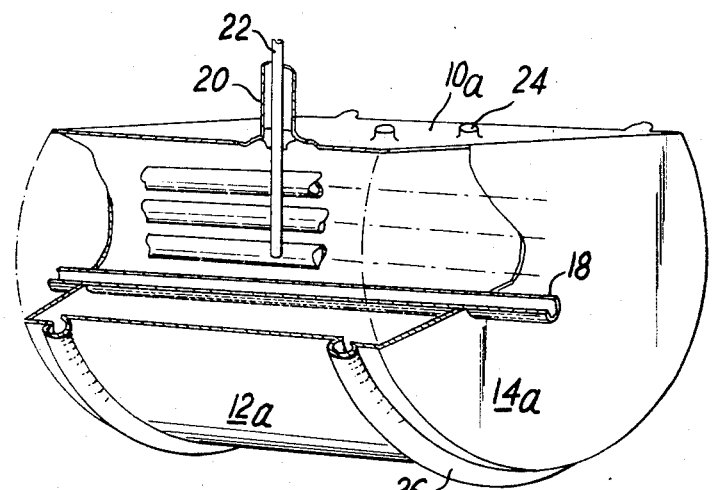
FIGS. 4 and 5 are diagrammatic views in perspective of two moderator tanks which constitute two forms of execution of the invention.

FIG. 4 shows a tank which constitutes one embodiment of the invention and comprises rigid end-shields which fix the positions of the pressure tubes. In FIGS. 1 to 4, the same reference numerals (followed by the index $a$ in FIG. 1) are again employed to designate similar elements.

The moderator tank of FIG. 4 is composed of a casing and two rigid end-shields (only one of which is clearly shown in FIG. 4 and has the reference 14a). The pressure tubes 18 pass through and are supported by said end-shields. The casing is composed of a rigid top wall 10a constituted by a plate of substantial thickness or an internally braced caisson, and a side wall 12a which is capable of deformation in the event of internal overpressure.

It is then an easy matter to secure to the plate 10a the tubes such as 20 which are provided for the insertion of the control rods such as the rod 22. Stubs 24 of tie-rods for the suspension of the tank are also shown. The through-tubes 20 can be of small diameter and identical with each other; they can be placed in position in an additional component which can readily be machined after fixing of the tubes by welding; such components can be made with high precision and in a non-deformable manner, and can even be reinforced by a concrete framework.

It will be apparent that precautions must be taken to ensure that the plate 10a which carries the tubes 20 on the one hand and the elements which serve to support the calandria end-shields and pressure tubes on the other hand are anchored to the concrete shield structure (not shown) which surrounds the tank, in order that any possible displacements of the control rod guide tubes relatively to the pressure tubes under the effect of variations in temperature and pressure may thus be minimized.

The adoption of a moderator tank in accordance with the invention makes it necessary to allow for substantial relative displacements of the generator-lines of the side wall in locations other than the zone of junction with the plate 10a when an internal overpressure occurs. For example, it can be seen from FIG. 2 that a point such as A which is located in the plane of maximum width of the tank moves to A' when such a deformation takes place. It is therefore necessary to ensure that the junction of the side wall with the end-walls permits relative displacements while remaining leak-tight. In the embodiment which is shown in FIG. 4 and FIG. 6 (which is a diagrammatic cross-section along a horizontal plane), this mobility is obtained by interposition of an external and flexible toric element 26 having the shape of a roll. In the event of overpressure occurring, when the side wall 12a changes from the shape which is shown in full lines to the shape shown in chain-dotted lines in FIG. 6, the toric coupling elements 26 follow the displacements of the edges of the side wall 12a.

Figure 5:
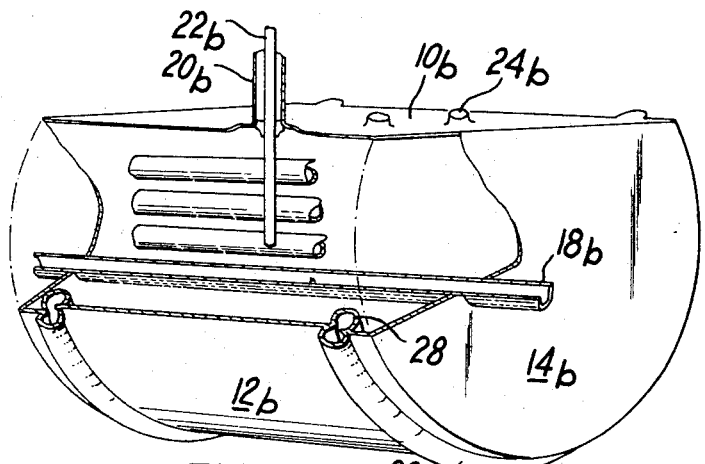

Instead of comprising a single flexible member for each end-shield, the coupling means can comprise two rolls 26b and 28 as indicated in FIGS. 5 and 7 which are similar to FIGS. 4 and 6. The inner roll not only provides a strengthening means but also economizes a substantial quantity of heavy water in a zone in which the usefulness of this latter is limited. The zone which is located between the inner and outer rolls is preferably filled with gas under pressure in order to forestall any danger of buckling of the inner roll under the action of hydrostatic forces in the event of overpressure arising within the tank.

Among the methods of geometrical construction employed for drawing the transverse section of a moderator tank according to the invention, the iteration method can usefully be adopted. This method will now be described, it being assumed that the following parameters are imposed:

$h_c$: height of the tank,
$h_o$: relative pressure as measured in depth of moderator liquid at the level of the top wall,
$d$: width of the top wall.

The method consists in fixing arbitrarily a constant unitary effort which will be represented by the radius of the circle Γ which constitutes the dynamic curve of the curve to be plotted, in constructing the corresponding transverse section by segments, in comparing the point of arrival with the level of the top wall at the required point and if necessary in re-constructing with a rectified unitary effort.

Figure 9:
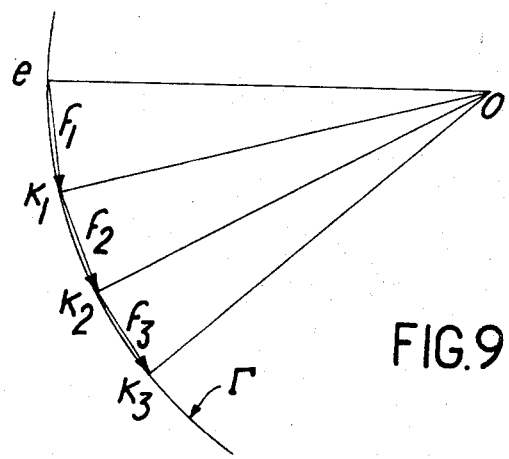
FIGS. 8 and 9 illustrate by way of example of method for the geometrical construction of the side wall.
Figure 8:
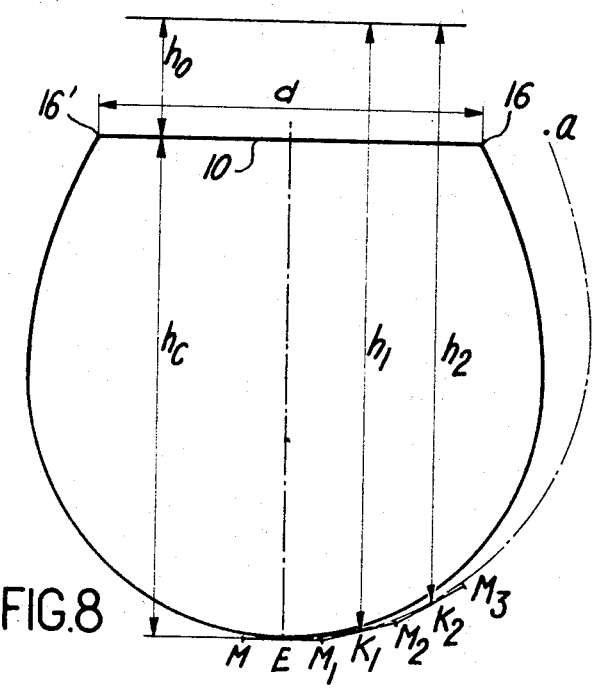

FIG. 8 shows diagrammatically in transverse cross-section the top wall 10 having a width $d$ and a height $h_c$. FIG. 9 shows a circle Γ having a radius which is taken arbitrarily and whose radius represents the unitary effort which is chosen.

The construction is accordingly carried out as follows:

Starting from the lowest point E of the tank, there is drawn a horizontal straight-line segment $MM_1$ having an arbitrary length 1 and having as its mid-point E, the length 1 being necessarily small compared with $h_c$ and $d$, Starting from the point $e$ (intersection of the circle Γ with its horizontal diameter), there is drawn a circular arc having a length $f_1=(h_c+h_o)1$; this arc intersects Γ at a point $k_1$: the segment $ek_1$ represents the force on $MM_1$, Starting from $M_1$, there is drawn a straight-line segment $M_1M_2$ having a length 1 and parallel to $k_1O$ (O being the center of the circle Γ), $K_1$ being the mid-point, $M_1M_2$ and $h_1$ being the distance from $K_1$ to the horizontal line Δ representing $h_o$ there is drawn with $k_1$ as its center a circular arc having a radius $f_2=h_1l$ which intersects the circle Γ at $k_2$, Starting from $M_2$, there is drawn a straight-line segment $M_2M_3$ having a length 1 and parallel to $k_2O$, $K_2$ being the mid-point of $M_2M_3$ and $h_2$ being the distance from $K_2$ to the horizontal line Δ, there is then drawn with $k_2$ as its center a circular arc having a radius $f_3=h_2l$ which intersects the circle (Γ) at $k_4$, The same construction is continued: there is thus constructed from point to point a succession of segments $MM_1$, $M_1M_2$, $M_2M_3$ . . . which will intersect the level of the end-shield at a point which is usually different from 16, which is the extremity provided for the wall 10. If $a$ is external to the wall 10, a similar construction will be made by replacing the circle Γ by a circle Γ' having a smaller radius (which is the case of the figure); in the contrary case, a large radius will be taken. By suitably choosing the successive radii of the circles, the point 16 can be caused to coincide with the extremity of the catenary line: the envelope curve of the corresponding segments will provide the final outline.

This type of layout is based on the fact that the curve which constitutes the transverse section of the side wall is the catenary curve, which passes through E and the ends of the wall 10, of the system of pressure forces which are applied to the calandria tank. A further property of said catenary curve is that it has a radius of curvature which is inversely proportional at all points to the difference in absolute pressures prevailing on each side of the wall.

What we claim is:

1. A moderator tank for pressure tube reactors, said tank comprising a rigid horizontal top wall, a cylindrical side wall which is more readily deformable and has horizontal generator-lines, the director-line of said wall being substantially the catenary curve which corresponds to the hydrostatic distribution of the pressure of the moderator contained in the tank, and two end walls traversed by the pressure tubes.

2. A moderator tank in accordance with claim 1, said tank being suspended by means of tie-rods secured to the rigid top wall.

3. A moderator tank in accordance with claim 1, wherein the end walls of said tank are constituted by rigid plates and are joined to the side wall by means of deformable leak-tight coupling means.

4. A moderator tank in accordance with claim 3, wherein each deformable leak-tight coupling means is constituted by at least one deformable toric element which is joined to the end wall and to the side wall of said tank, said element being located outside the tank in such a manner as to be subjected to tension by the moderator.

5. A moderator tank in accordance with claim 4, wherein each deformable leak-tight coupling means comprises a second toric element which is placed inside the tank, the zone located between the outer and inner elements being pressurized in order to prevent any danger of buckling of the inner toric element under the action of overpressure within said tank.

References Cited

UNITED STATES PATENTS

| | | | |
|---|---|---|---|
| 2,765,098 | 10/1956 | Tangard | 220—3 X |
| 3,330,735 | 7/1967 | Hassig et al. | 176—87 X |

FOREIGN PATENTS

| | | |
|---|---|---|
| 716,397 | 8/1965 | Canada. |

REUBEN EPSTEIN, *Primary Examiner.*